(12) United States Patent
Liao et al.

(10) Patent No.: US 6,859,862 B1
(45) Date of Patent: Feb. 22, 2005

(54) METHOD AND APPARATUS FOR SOFTWARE MANAGEMENT OF ON-CHIP CACHE

(75) Inventors: Yu-Chung C. Liao, Austin, TX (US); Peter A. Sandon, Essex Junction, VT (US); Howard Cheng, Redmond, WA (US); Peter Hsu, Fremont, CA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/545,184

(22) Filed: Apr. 7, 2000

(Under 37 CFR 1.47)

(51) Int. Cl.⁷ .............................................. G06F 12/08
(52) U.S. Cl. ...................... 711/129; 711/130; 711/133; 711/153; 711/152
(58) Field of Search ................................. 711/130, 129, 711/133, 170, 123, 217, 214, 215, 220, 219, 173, 163, 152, 153; 712/35, 36, 22, 222, 4

(56) References Cited

U.S. PATENT DOCUMENTS

| | | | |
|---|---|---|---|
| 4,084,224 A | 4/1978 | Appell et al. ............... 709/100 |
| 4,177,510 A | 12/1979 | Appell et al. ............... 711/163 |
| 5,170,474 A | 12/1992 | Sakamura et al. ............. 707/6 |
| 5,187,793 A | 2/1993 | Keith et al. ................. 712/225 |
| 5,493,667 A | * 2/1996 | Huck et al. ................. 711/125 |
| 5,510,934 A | 4/1996 | Brennan et al. ............ 711/119 |
| 5,526,504 A | 6/1996 | Hsu et al. ................... 711/207 |
| 5,537,538 A | 7/1996 | Bratt et al. ................. 711/133 |
| 5,537,571 A | 7/1996 | Deville ....................... 711/133 |
| 5,539,892 A | 7/1996 | Reininger et al. .......... 711/207 |
| 5,572,704 A | 11/1996 | Bratt et al. ................. 711/161 |
| 5,588,138 A | 12/1996 | Bai et al. .................... 711/173 |
| 5,594,886 A | 1/1997 | Smith et al. ................ 711/136 |
| 5,604,909 A | 2/1997 | Joshi et al. .................. 712/208 |
| 5,632,025 A | 5/1997 | Bratt et al. .................. 711/152 |
| 5,638,500 A | 6/1997 | Donovan et al. ........... 345/625 |
| 5,694,567 A | 12/1997 | Bourekas et al. ............... 711/3 |
| 5,734,874 A | 3/1998 | Van Hook et al. .......... 345/559 |
| 5,737,750 A | 4/1998 | Kumar et al. ............... 711/129 |
| 5,740,402 A | 4/1998 | Bratt et al. .................. 711/157 |

(List continued on next page.)

FOREIGN PATENT DOCUMENTS

| | | |
|---|---|---|
| JP | 62197842 | 9/1987 |
| JP | 63086048 | 4/1988 |
| JP | 4080844 | 3/1992 |
| JP | 5120134 | 5/1993 |

OTHER PUBLICATIONS

Motorola Inc., "PowerPC Microprocessor Family: The Programming Environments", 1994.
IBM, "PowerPC 740 and PowerPC 750 RISC Microprocessor Family User Manual", 1998.
Byte Magazine, "Zen and the Art of Cache Maintenance", 1997.

Primary Examiner—Pierre-Michel Bataille
(74) Attorney, Agent, or Firm—Nixon & Vanderhye P.C.

(57) ABSTRACT

A microprocessor including a control unit and a cache connected with the control unit for storing data to be used by the control, wherein the cache is selectively configurable as either a single cache or as a partitioned cache having a locked cache portion and a normal cache portion. The normal cache portion is controlled by a hardware implemented automatic replacement process. The locked cache portion is locked so that the automatic replacement process cannot modify the contents of the locked cache. An instruction is provided in the instruction set that enables software to selectively allocate lines in the locked cache portion to correspond to locations in an external memory, thereby enabling the locked cache portion to be completely managed by software.

2 Claims, 4 Drawing Sheets

DMA_L bit settings

| Bit(s) | Name | Description |
|---|---|---|
| 0-26 | LC_ADDR | High order bits of the starting address in locked cache. |
| 27 | DMA_LD | Load command<br>0 Store - transfer from locked cache to external memory<br>1 Load - transfer from external memory to locked cache |
| 28-29 | DMA_LEN_L | Low order bits of transfer length in cache lines |
| 30 | DMA_T | Trigger bit.<br>0 DMA command inactive<br>1 DMA command is ready to be queued. |
| 31 | DMA_F | Flush bit.<br>0 Normal DMA operation<br>1 Flush the DMA queue. |

U.S. PATENT DOCUMENTS

| | | | |
|---|---|---|---|
| 5,742,277 A | 4/1998 | Gossett et al. | 345/611 |
| 5,774,685 A | 6/1998 | Dubey | 345/505 |
| 5,822,764 A * | 10/1998 | Hardage et al. | 711/145 |
| 5,864,703 A | 1/1999 | Van Hook et al. | 712/22 |
| 5,875,464 A | 2/1999 | Kirk | 711/129 |
| 5,875,465 A | 2/1999 | Kilpatrick et al. | 711/134 |
| 5,898,854 A | 4/1999 | Abramson et al. | 712/218 |
| 5,931,945 A | 8/1999 | Yung et al. | 712/300 |
| 5,933,157 A | 8/1999 | Van Hook et al. | 345/563 |
| 5,933,650 A | 8/1999 | Van Hook et al. | 712/2 |
| 5,938,756 A | 8/1999 | Van Hook et al. | 712/23 |
| 5,954,815 A | 9/1999 | Joshi et al. | 712/237 |
| 5,966,734 A | 10/1999 | Mohamed et al. | 711/173 |
| 5,974,507 A | 10/1999 | Arimilli et al. | 711/133 |
| 5,974,508 A | 10/1999 | Maheshwari | 711/133 |
| 5,978,888 A | 11/1999 | Arimilli et al. | 711/128 |
| 5,982,939 A | 11/1999 | Van Hook | 382/255 |
| 6,000,014 A | 12/1999 | Arimilli et al. | 711/128 |
| 6,014,728 A | 1/2000 | Baror | 711/142 |
| 6,044,478 A * | 3/2000 | Green | 711/141 |
| 6,047,358 A * | 4/2000 | Jacobs | 711/133 |
| 6,205,548 B1 * | 3/2001 | Hasbun | 711/170 |
| 6,438,655 B1 * | 8/2002 | Nicol et al. | 711/136 |
| 6,493,800 B1 * | 12/2002 | Blumrich | 711/129 |
| 6,681,296 B2 * | 1/2004 | Liao et al. | 711/129 |

\* cited by examiner

HID2 register bit settings

| Bit(s) | Name | Description |
|---|---|---|
| 0 | LSQE | Load/Store quantized enable (non-indexed format)<br>0 psq_l[u] and psq_st[u] instructions are illegal<br>1 psq_l[u] and psq_st[u] instructions can be used |
| 1 | WBE | Write buffer enable<br>0 write buffer is disabled<br>1 write buffer enabled to gather non-cacheable data |
| 2 | PSE | Paired singles enabled<br>0 paired singles instructions are illegal<br>1 paired singles instructions can be used |
| 3 | LCE | Locked cache enable<br>0 Cache is not partitioned - 32 kB of normal cache<br>1 Cache is partitioned - 16 kB of normal cache and 16 kB of locked cache available |
| 4-7 | DMAQL | DMA queue length (read only)<br>the number of used queue positions in the DMA from 0 (queue empty) to 15 (queue full) |
| 8-31 | - | Reserved |

*Fig. 2* dcbz_l
Data Cache Block Set to Zero Locked
dcbz_l    rA, rB

| 4 | 00000 | A | B | 1014 | 0 |
|---|---|---|---|---|---|
| 0 | 5 6 | 10 11 | 15 16 | 20 21 | 30 31 |

*Fig. 3*

DMA_U bit settings

| Bit(s) | Name | Description |
|---|---|---|
| 0-26 | MEM_ADDR | High order address bits of starting address in main memory |
| 27-31 | DMA_LEN_U | High order bits of transfer length in cache lines |

*Fig. 5*

DMA_L bit settings

| Bit(s) | Name | Description |
|---|---|---|
| 0-26 | LC_ADDR | High order bits of the starting address in locked cache. |
| 27 | DMA_LD | Load command<br>0 Store - transfer from locked cache to external memory<br>1 Load - transfer from external memory to locked cache |
| 28-29 | DMA_LEN_L | Low order bits of transfer length in cache lines |
| 30 | DMA_T | Trigger bit.<br>0 DMA command inactive<br>1 DMA command is ready to be queued. |
| 31 | DMA_F | Flush bit.<br>0 Normal DMA operation<br>1 Flush the DMA queue. |

*Fig. 6*

METHOD AND APPARATUS FOR SOFTWARE MANAGEMENT OF ON-CHIP CACHE

CROSS-REFERENCE TO RELATED APPLICATIONS

This application is related to U.S. application Ser. No. 09/545,182, entitled "METHOD AND APPARATUS FOR OBTAINING A SCALAR VALUE DIRECTLY FROM A VECTOR REGISTER" and U.S. application Ser. No. 09/545,183, entitled "METHOD AND APPARATUS FOR EFFICIENT LOADING AND STORING OF VECTORS", filed by the same inventors on the same date as the instant application. Both of these related cases are hereby incorporated by reference in their entirety.

FIELD OF THE INVENTION

This invention relates to microprocessors, and, more particularly, to a method and apparatus which improves the operational efficiency of microprocessors having on-chip cache by enabling software management of at least a portion of the cache.

BACKGROUND OF THE INVENTION

The electronic industry is in a state of evolution spurred by the seemingly unquenchable desire of the consumer for better, faster, smaller, cheaper and more functional electronic devices. In their attempt to satisfy these demands, the electronic industry must constantly strive to increase the speed at which functions are performed by microprocessors. Videogame consoles are one primary example of an electronic device that constantly demands greater speed and reduced cost. These consoles must be high in performance and low in cost to satisfy the ever increasing demands associated therewith. The instant invention is directed to increasing the speed at which microprocessors can process information by improving the efficiency at which data and/or instructions can be loaded for processing.

A cache is a high speed memory that is provided on the microprocessor chip for the purpose reducing the number of times that data required for executing commands must be retrieved from main memory. Cache devices provide a close and convenient place for storing data and/or instructions to be used by the control unit of the microprocessor in a fast and efficient manner. Today, all high-performance microprocessors incorporate at least one on-chip level one (L1) cache for storing previously used data and/or instructions.

Main memory is external to the microprocessor and access thereto is provided through a bus which connects the microprocessor to the main memory. The bus connecting the microprocessor and the main memory is controlled by a Bus Interface Unit (BUI). Due to the fact that the main memory accesses must go through the BUI and bus to obtain the requested data from the off-chip memory, accessing this memory is relatively inconvenient and slow as compared to accessing the on-chip cache.

With today's technology, accessing the off-chip main memory can take anywhere from ten to hundreds of CPU clock cycles (a time unit by which the microprocessor or central processing unit (CPU) operates). In contrast, accessing on-chip memory, such as a memory designed to operate as an on-chip cache, can take as few as only one or two CPU clock cycles. Thus, data can be retrieved from a cache at least about ten times faster than the time that it would take to retrieve that same data from main memory. As a result, effective use of the cache can be a critical factor in obtaining optimal performance for applications running on a microprocessor. The drastic time difference between loading desired code or data from an on-chip cache as compared to loading from the main memory is so great (an order of magnitude or more) that effective cache management can be a dominant factor in determining the speed of an application executed by the microprocessor, or even the speed of the entire system built around the microprocessor.

Generally speaking, a cache operates by storing data and/or instructions that have been previously requested by the control unit and retrieved from main memory in the on-chip cache for possible use again by the control unit at a later time. If a second request is made by the control unit for that same data, the data can be quickly retrieved from the cache rather than having to again retrieve the data from the off-chip main memory. In this manner, the speed of the application can be increased by minimizing the need to access the relatively slow main memory.

One limitation, however, regarding the use of cache is that size and cost factors limit the cache to a size that is significantly small relative to the size of the main memory. As a result, the cache quickly becomes full with data that has been retrieved from main memory or elsewhere, thereby preventing additional data required by the control unit from being stored in the cache. Typically, a microprocessor, such as the microprocessors in IBM's PowerPC (IBM Trademark) family of microprocessors (hereafter "PowerPC"), includes a 32 kilobyte (32 k) on-chip level one (L1) instruction (I) cache and a 32 K L1 data (D) cache (Harvard Architecture), as well as a level two (L2) cache providing additional on-chip cache functionality. For more information on the PowerPC microprocessors see *PowerPC 740 and PowerPC 750 RISC Microprocessor Family User Manual*, IBM 1998 and *PowerPC Microprocessor Family: The Programming Environments*, Motorola Inc. 1994, both of which are hereby incorporated by reference in their entirety.

In view of the size limitation on caches, the microprocessor includes hardware that manages the cache in accordance with an algorithm that attempts to predict which data read from main memory is likely to be needed again in the near future by the processing unit. In other words, the cache control hardware is designed according to an algorithm that tries to predict in advance what data from main memory to maintain in the limited amount of storage space available in the cache for later use by the processing unit. Thus, every microprocessor having such a cache incorporates some type of hardware implemented algorithm for managing the contents of the cache. An example of such an automatic replacement algorithm used in the PowerPC is a pseudo least-recently-used (PLRU) replacement algorithm The automatic replacement algorithm used in a particular microprocessor to manage the contents of the cache, however, is not necessarily optimal or even effective for certain applications run by the microprocessor. In other words, the algorithm implemented by cache control hardware does not always result in efficient cache management for all applications designed for the microprocessor. For example, in certain applications the hardware may drop data from the cache right before it is needed a second time, thereby requiring the processor to obtain the dropped data from main memory, even though the desired data was in the cache moments earlier. This problem results from the fact that one cannot predict in advance the needs of every application that may be implemented using the microprocessor. As a result, some applications will not be able to use the cache in an efficient manner, thereby preventing such applications from running as fast as they otherwise could with efficient cache management. In fact, for some applications, the automatic replacement algorithms perform poorly, thereby preventing the desired low-latency memory accesses for which the cache is designed.

One strategy that has been used in the past in connection with caches to improve application performance is to provide in the instruction set of the microprocessor a mechanism that enables software assisted cache management. Most modern microprocessors provide instructions in the instruction set which enable software to assist the cache management hardware to some degree in managing the cache. For example, the PowerPC architecture contains several user-accessible instructions in the instruction set for manipulating the data cache that can significantly improve overall application performance. These instructions are: "block touch" (dcbt); "block touch for store" (dcbtst); "block flush" (dcbf); "block store" (dcbst); and "block set to zero" (dcbz) see *Zen and the Art of Cache Maintenance, Byte Magazine, March* 1997.

In order to understand the operation of these or similar instructions, it is important to define what a "block" is in this context. A block is the fundamental unit of memory on which the cache operates. The cache handles all memory load and store operations using blocks. The particular block size can vary from one microprocessor to another. For example, the PowerPC 601 uses 64-byte blocks, while the PowerPC 603 and 604 user 32-byte blocks.

Each of the above-identified instructions operates on a pair of general purpose register (GPR) operands whose sum forms the effective address of the memory location(s) to be affected by the instruction. The dcbt and dcbtst instructions provide "hints" to the processor that the addressed data block may be needed by the application in the near future, thereby giving the processor the option of loading, or at least allocating, the memory block in the cache. Thus, when placed appropriately ahead of the anticipated need for data from memory, the dcbt instruction can be used to request that the processor bring data from memory (or from a secondary cache) into the primary data cache, thereby helping to avoid a cache miss, i.e. not finding the desired data in the cache when needed by the processor. It is noted that these instructions only provide "hints" to the processor and do not require that the processor actually load the data block identified by the instructions. In other words, the hints are taken under advisement by the processor which then decides based on other needs whether the data block will be loaded. These hints are treated differently depending on the particular implementation in the PowerPC family. The dcbtst instruction behaves in a similar manner except that it provides the additional hint that the corresponding memory location is going to be overwritten soon. Thus, these two instructions do not provide direct control over the contents of the cache. Moreover, even if the processor does load the identified block, the automatic replacement algorithm may overwrite that data in the cache before it can be used. As a result, these instructions have limited ability to help manage the cache in an efficient manner for a particular application.

The dcbf and dcbst instructions in the PowerPC instruction set force modified (or dirty) data out of the cache and back into memory. The primary difference between these two instructions is that dcbf not only copies data back to memory (like dcbst), but it also marks the corresponding cache block as invalid. The dcbz instruction in the PowerPC instruction set allocates a block of data in the cache and then initializes the block to a series of zeros. Thus, this instruction modifies data in the cache. This instruction can be a useful tool for boosting performance when zeroing a large block of data. Again, these three instructions have only a limited ability to provide software assistance to the cache management hardware, because the hardware is still in control of the data in the cache and will continue to operate on the entire cache in accordance with the hardware algorithm.

Thus, while some tools are available for programmers to use in order to try and help their particular application utilize the cache in an efficient manner, the cache is still ultimately controlled by the cache management hardware. As a result, if the replacement algorithm implemented by the hardware does not perform well for a particular application, the application will not run in an optimal manner on the microprocessor, regardless of the limited software assistance that can be provided by instructions such as those described above. In other words, the programmer cannot completely control the contents of any portion of the cache with these or similar software techniques. Thus, many applications do not run as fast as they otherwise could if the cache could be managed in a more efficient manner for the particular application. Accordingly, a need exists for improving the use of cache in a microprocessor on an application specific basis. The instant invention satisfies this need.

It is noted that, in addition to cache, some microprocessors have on-chip memory that can be used as a scratch pad memory (SPM), i.e. an on-chip memory that does not perform demand-driven, automatic replacement of memory blocks. An SPM can be used by the application to store, for example, data from a contiguous portion (memory block) of the main memory, wherein a base address of the contiguous memory block is defined in a specific register created for this purpose or is defined using the memory management facilities that exist for accessing other parts of the memory system. However, SPM is a memory, not a cache, and therefore does not provide the advantages or functionality of a cache. Some microprocessors have enabled a certain contiguous range of the available address space to be allocated to the SPM. While use of on-chip SMP can improve the performance of the microprocessor for certain applications, it does not solve the problem of cache management described in detail above.

SUMMARY OF THE INVENTION

The instant invention enables more efficient use of on-chip cache, such as a level one data cache in the IBM PowerPC or the like, by enabling the cache to be partitioned into a first portion that operates in a conventional manner under hardware control, and a second portion which can be completely controlled and managed by software.

In a preferred embodiment of the invention, the entire cache can be used as a conventional cache, or the cache can be reconfigured so as to define part of the cache as a locked software controlled cache, referred to herein as a "locked cache" or "scratch pad cache". What is meant by "locked" in this context is that the contents of the locked portion of the cache cannot be altered by the hardware cache management system. By locking the portion of the cache designed for software control, the cache can be managed independently of the hardware cache management system. As a result, poor performance can be avoided even if the hardware algorithm does not work well for the needs of a particular application.

The locking of the cache can be done by, for example, providing a special purpose register (e.g. HID2) having a bit (e.g. $4^{th}$ bit) which controls whether the cache is to function as a single hardware controlled cache or a partitioned cache including a locked software controlled portion. Other bits in the special purpose register can be used, for example, to control other enhancement options that may be available on the microprocessor.

In order to allocate blocks of memory in the locked cache, at least one additional instruction (e.g. dcbz_1) is preferably provided in the instruction set of the microprocessor that implements this invention. This additional instruction is used to control on a block-by-block basis exactly what data is contained in the locked portion of the cache, thereby giving the application programmer complete freedom to keep or remove blocks of data from the cache as required for efficient processing of his application. In this way, the utilization of the cache can be maximized regardless of the particular hardware algorithm used to manage the normal or non-locked portion of the cache. Moreover, by enabling selective partitioning of the cache into a locked and regular cache, the entire cache can still be used in the conventional manner if it is determined that the hardware algorithm will work satisfactorily for a particular application. On the other hand, if it is determined that the particular application would perform better using a portion of the cache as a software controlled cache, the cache may be partitioned and locked so that the locked portion can be managed exclusively by the software.

The locked portion of the cache is basically a scratch pad memory (SPM) but which operates as a cache instead of a memory. Thus, the invention provides a locked cache or scratch pad cache (SPC) that can be used and managed solely by the application, without interference from the hardware cache management system, to increase the efficiency of the application on a particular microprocessor.

A major advantage of the locked cache as compared to a convention scratch pad memory is that the locked cache allows flexibility of software management for data that does not exhibit the spatial and temporal locality for which normal caches are designed. One example is a multimedia data stream that is larger than the cache, and is used once and then discarded. Such data would replace all other data in a normally managed cache, and then continually replace itself, yielding very low cache hit rates. Another example, having different characteristics, is high usage instruction libraries or data tables which do not fit in the cache, but have access patterns that would cause thrashing if they are managed by hardware. The invention overcomes these and other problems by allowing 100% software control of a portion of the cache.

In accordance with a preferred embodiment of the invention, a direct memory access (DMA) engine is provided in the microprocessor and is used to transfer data between the locked data cache and the external memory. The DMA engine's operation is controlled by two special purpose registers (SPR) used respectively to control one DMA transfer into and out of the locked cache.

BRIEF DESCRIPTION OF THE DRAWINGS

Other objects, features and advantages of the instant invention will become apparent upon review of the detailed description below when read in conjunction with the accompanying drawings, in which:

FIG. 2 is a table showing an exemplary special purpose register used to control the partitioning of the cache and other optional enhancements to the microprocessor of FIG. 1, in accordance with one embodiment of the instant invention;

FIG. 3 shows an exemplary instruction definition for addition to an instruction set of the microprocessor of FIG. 1 that may be used to allocate blocks in the locked cache, in accordance with one embodiment of the instant invention.

FIGS. 5 and 6 are tables showing an exemplary bit definition for two exemplary special purpose registers used in the DMA engine of FIG. 4, in accordance with the one embodiment of the instant invention.

DETAILED DESCRIPTION OF THE PREFERRED EMBODIMENTS

In the following description, numerous specific details are set forth regarding a preferred embodiment of the instant invention. However, the specific details are meant to be exemplary only and are not meant to limit the invention to the particular embodiment described herein. In other words, numerous changes and modifications may be made to the described embodiment without deviating from the true scope and spirit of the instant invention, as a person skilled in the art will readily understand from review of the description herein.

Figure 1:
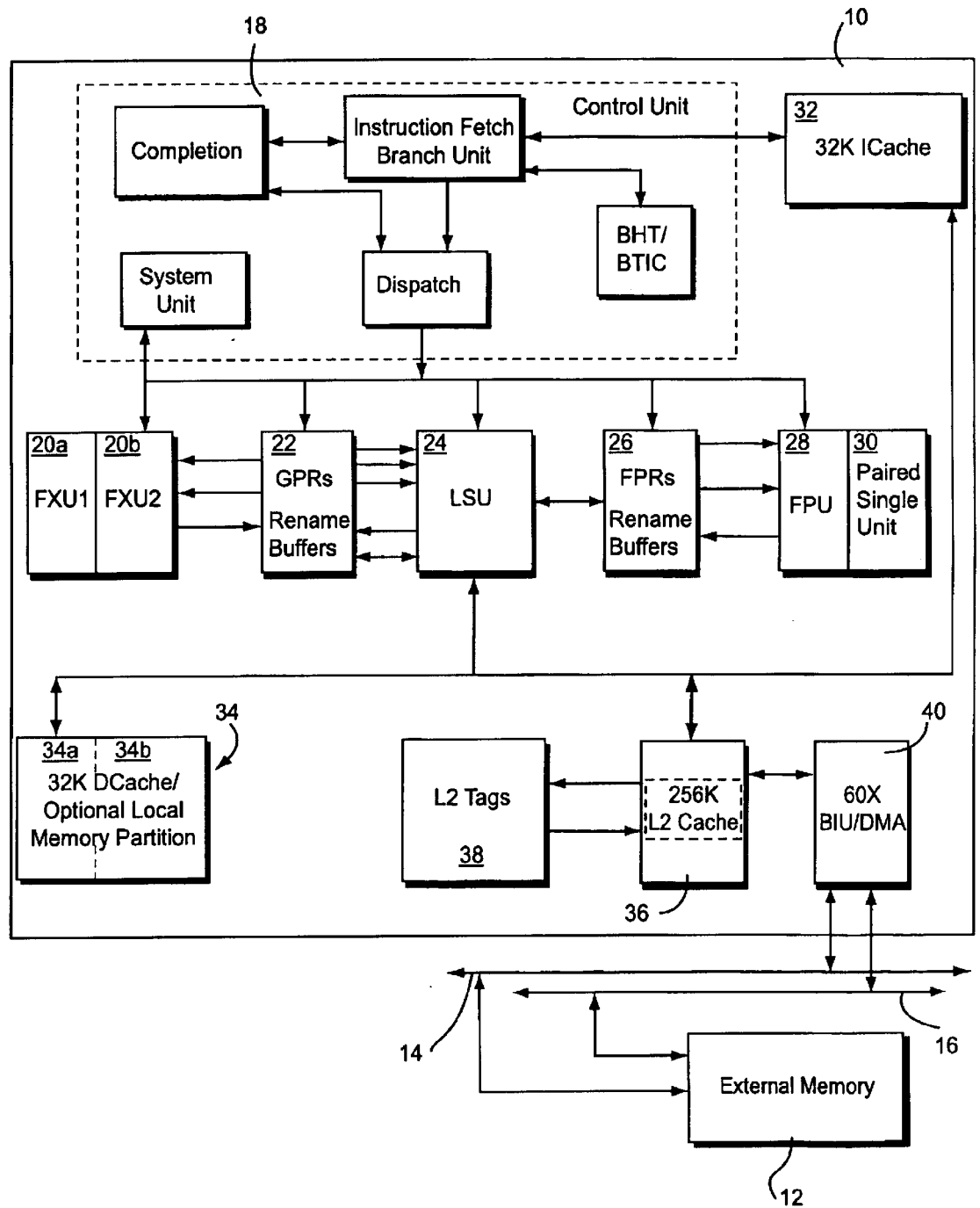
FIG. 1 is a general block diagram of an exemplary microprocessor and external memory illustrating a preferred embodiment of the instant invention.

FIG. 1 is a diagram of a single-chip microprocessor 10 in which the present invention has been implemented. It is noted that FIG. 1 only shows a simplified representation of a microprocessor, due to that fact that the majority of the elements in the microprocessor, as well as their interconnection and operation, are well known to one skilled in the art. Thus, in order not to obscure the instant invention with details regarding known elements, the drawings and description herein are presented in a simplified form and only to the extent necessary to provide a full understanding of the instant invention for a person skilled in the art.

The microprocessor 10 is connected, in a known manner, to an off-chip (external) memory 12 or main memory via an address bus 14 and data bus 16. The external memory 12 contains data and/or instructions, such as 3D graphics instructions, needed by the microprocessor 10 in order perform desired functions. It is noted that the microprocessor 10 and external memory 12 may be implemented in a larger overall information processing system (not shown). The microprocessor includes a control unit 18, fixed point units 20a and 20b, general purpose registers (GPRs) 22, a load and store unit 24, floating point unit 28, paired single unit (vector processing unit) 30 and floating point registers 26, all of which generally interconnect and operate in a known manner. In addition, the microprocessor 10 includes a level one instruction cache 32, a level one data cache 34, a level two cache 36 with associated tags 38, and bus interface unit/direct memory access engine (BIU/DMA) 40. In this embodiment, the instruction cache 32, level two cache 36 and level two cache tags 38 generally operate in a conventional manner. However, as will be explained in detail below, the data cache 34 and the direct memory access unit have special operations and features in accordance with the instant invention.

The structure and operation of this exemplary microprocessor 10 is similar to IBM's PowerPC microprocessors, with certain modifications to implement the instant invention. Details regarding the operation of most of the elements of this exemplary microprocessor are found in the following publications: *PowerPC 740 and PowerPC 750 RISC Micro-*

*processor Family User Manual*, IBM 1998 and *PowerPC Microprocessor Family: The Programming Environments*, *Motorola Inc.* 1994. It is noted, however, that the instant invention may be implemented on any suitable microprocessor or information processing system to improve the management of cache.

In the exemplary embodiment of FIG. 1, the microprocessor includes separate 32-Kbyte, eight-way associative instruction and data caches (32 and 34) to allow the various execution units (18, 20a, 20b, 28 and 30) and registers rapid access to instructions and data, thereby reducing the number of relatively slow accesses to the external memory 12. The caches preferably implement a pseudo least-recently-used (PLRU) replacement algorithm for managing the contents of the caches. The cache directories are physically addressed, the physical (real) address tag being stored in the cache directory. Both the instruction and data caches have 32-byte cache block size, wherein a cache block is the block of memory that a coherency state describes (also referred to as a cache line). Two coherency state bits for each data cache block allow encoding for three states—Modified (exclusive) (M), Exclusive (unmodified) (E), and Invalid (I)—thereby defining an MEI three-state cache coherency protocol. A single coherency state bit for each instruction cache block allows encoding for two possible states: invalid (INV) or Valid (VAL). In accordance with the instant invention, each cache can be invalidated or locked by setting the appropriate bits in a hardware implementation-dependent register (a special purpose register described in detail below).

The microprocessor 10 preferably supports a fully-coherent 4-Gbyte physical address space. Bus snooping is used to drive the MEI three-state cache coherency protocol that ensures the coherency of global memory with respect to the processor's data cache. The data cache 34 coherency protocol is a coherent subset of the standard MESI four-state cache protocol that omits the shared state. The data cache 34 characterizes each 32-byte block it contains as being in one of three MEI states. Addresses presented to the cache are indexed into the cache directory with bits A(20–26), and the upper-order 20 bits from the physical address translation (PA(0–19)) are compared against the indexed cache directory tags. If neither of the indexed tags matches, the result is a cache miss (required data not found in cache). On a cache miss, the microprocessor cache blocks are filled in four beats of 64 bits each. The burst fill is performed as a critical-double-word-first operation—the critical double word is simultaneously written to the cache and forwarded to the requesting unit, thus minimizing stalls due to cache fill latency. If a tag matches, a cache hit occurred and the directory indicates that state of the cache block through two state bits kept with the tag. The microprocessor 10 preferably has dedicated hardware to provide memory coherency by snooping bus transactions.

Both caches 32 and 34 are preferably tightly coupled into the bus interface unit (BUI) 40 to allow efficient access to the system memory controller and other potential bus masters. The BUI 40 receives requests for bus operations from the instruction and data caches, and executes operations per the 60x bus protocol. The BUI 40 provides address queues, prioritizing logic and bus control logic. The BUI also captures snoop addresses for data cache, address queue and memory reservation operations. The data cache is preferably organized as 128 sets of eight ways, wherein each way consists of 32 bytes, two state bits and an address tag. In accordance with the instant invention, an additional bit may be added to each cache block to indicate that the block is locked. Each cache block contains eight contiguous words from memory that are loaded from an eight-word boundary (i.e., bits A(27–31) of the logical (effective) addresses are zero). As a result, cache blocks are aligned with page boundaries. Address bits A(20–26) provide the index to select a cache set. Bits A(27–31) select a byte within a block. The on-chip data cache tags are single ported, and load or store operations must be arbitrated with snoop accesses to the data cache tags. Load and store operations can be performed to the cache on the clock cycle immediately following a snoop access if the snoop misses. Snoop hits may block the data cache for two or more cycles, depending on whether a copy-back to main memory 12 is required.

The level one (L1) caches (32 and 34) are preferably controlled by programming specific bits in a first special purpose register (HID0—not shown) and by issuing dedicated cache control instructions. The HID0 special purpose register preferably contains several bits that invalidate, disable, and lock the instructions and data caches. The data cache 34 is automatically invalidated when the microprocessor 10 is powered up and during a hard reset. However, a soft reset does not automatically invalidate the data cache. Software uses the HID0 data cache flash invalidate bit (HID0(DCFI)) if the cache invalidation is desired after a soft reset. Once the HID0(DCFI) is set through move-to-special-purpose-register (mtspr) operation, the microprocessor automatically clears this bit in the next clock cycle (provided that the data cache is enabled in the HID0 register).

The data cache may be enabled or disabled by using the data cache enable bit (HID0(DCE)) which is cleared on power-up, disabling the data cache. When the data cache is in the disabled state (HID0(DCE)=0), the cache tag state bits are ignored, and all accesses are propagated to the L2 cache 36 or 60x bus as single beat transactions. The contents of the data cache can be locked by setting the data cache lock bit (HID0(DLOCK)). A data access that hits in a locked data cache is serviced by the cache. However, all accesses that miss in the locked cache are propagated to the L2 cache 36 or 60x bus as single-beat transactions. The microprocessor 10 treats snoop hits in the locked data cache the same as snoop hits in an unlocked data cache. However, any cache block invalidated by a snoop remains invalid until the cache is unlocked. The instruction cache 32 operates in a similar manner as the data cache described above, except that different bits are used in the HID0 register for invalidation and locking, i.e. instruction cache flash invalidate bit HID0 (ICFI) and instruction cache lock bit HID0(ILOCK).

The microprocessor preferably includes another hardware implementation-dependent special purpose register (HID2) that, in accordance with the instant invention, is used to modify how the data cache 34 is configured and used. Specifically, the HID2 register contains a lock cache enable bit (LCE) that controls whether the data cache 34 is configured as 32 kB of normal (hardware managed) cache (LCE=0) or is partitioned into a 16 kB of normal cache 34a and a 16 kB of locked cache 34b that can be controlled exclusively by software (LCE=1). Specifically, at power-up or reset, HID2(LCE) is set to be 0. Thus, at this time, the L1 data cache 34 is a 32 kB 8-way set-associative cache. However, when a move-to-special-register (mtspr) instruction sets HID2(LCE)=1, the data cache is configured as two partitions. The first partition 34a, consisting of ways 0–3, is then a 16 kB normal cache. The second partition 34b, consisting of ways 4–7, is then a 16 kB locked cache. The normal cache portion 34a operates like the unpartitioned cache 34, except that it behaves as a four-way set-associative cache. The operation of the locked cache partition 34b is described below.

An example definition for the HID2 register is shown in FIG. 2, wherein bit number 3 is the LCE bit for controlling how the data cache 34 is configured. The other bits in the HID2 register are used to control other enhanced features that may be provided in the microprocessor 10, such as data quantization, write buffering, paired singles operations, and DMA queue length as shown on FIG. 2. It is noted that, while FIG. 2 shows that bits 8–31 of the HID2 register are reserved, these bits may be used to indicate, for example, cache instruction hit error, DMA access to normal cache error, DMA cache miss error, DMA queue length overflow error, instruction cache hit error enable, DMA cache miss error enable, and DMA queue overflow error enable.

The microprocessor includes cache control instructions for controlling both the instruction and data caches, such as, for example, instructions generally corresponding to the dcbt, dcbst, dcbz, dcbst, dcbf, dcbi and icbi instructions in the PowerPC instruction set. The first six of these instructions have similar operation as described above with respect to the PowerPC instruction set, except that they now, in accordance with the instant invention, can be used in connection with both the locked portion 34b and the normal portion 34a of the data cache 34. The data cache block invalidate (dcbi) instruction is provided for invalidating a line in the locked portion 34b or the normal portion 34a of the data cache 34. The instruction cache block invalidate (icbi) instruction operates on the instruction cache 32 in generally the same manner as this same instruction operates in the PowerPC.

In accordance with an important aspect of the instant invention, a new instruction is provided in the instruction set of the microprocessor 10 for allocating lines in the locked portion 34b of the data cache 34 when the cache includes the locked portion as a result of changing the lock cache enable bit in the HID2 register to 1, i.e. HID2(LCE)=1.

FIG. 3 shows an exemplary definition for an instruction that can be used for this purpose. Specifically, as shown in FIG. 3, a data-cache-block-set-to-zero-locked (dcbz_1) instruction can be used for allocating lines or blocks in the locked cache. Preferably, the dcbz_1 instruction can be used to allocate on a block-by-block basis any block in the available memory address space. In other words, the allocation does not have to be linear, i.e. does not need to correspond to a contiguous block of memory, in contrast to a typical scratch pad memory. Moreover, due to the fact that the locked portion 34b of the cache is actually locked, the software has complete control over the contents of the cache without interference from the replacement algorithm (which controls the normal portion 34a of the cache 34 when partitioned, and controls the entire cache 34 when the cache is not partitioned, in accordance with a replacement algorithm, such a pseudo-LRU algorithm).

As can be seen in FIG. 2, the dcbz_1 instruction bit pattern includes bits 0 through 32, wherein bits 0 through 5 encode a primary op code of 4, bits 6 through 10 encode a reserved field of "00000", bits 11 through 15 designate a first register, bits 16 through 20 designate a second register, the content of which is to be added to the content of the first register to provide a cache block address to be cleared or allocated, bits 21 through 30 encode a secondary op code of "1014", and bit 31 encodes a reserved field of "0".

The dcbz_1 instruction is preferably the only mechanism available to allocate a tag for a 32 byte block in the locked cache 34b to be associated with a particular address in memory. The dcbi and dcbf instructions are operable to deallocate cache lines in the locked cache 34b.

Figure 4:
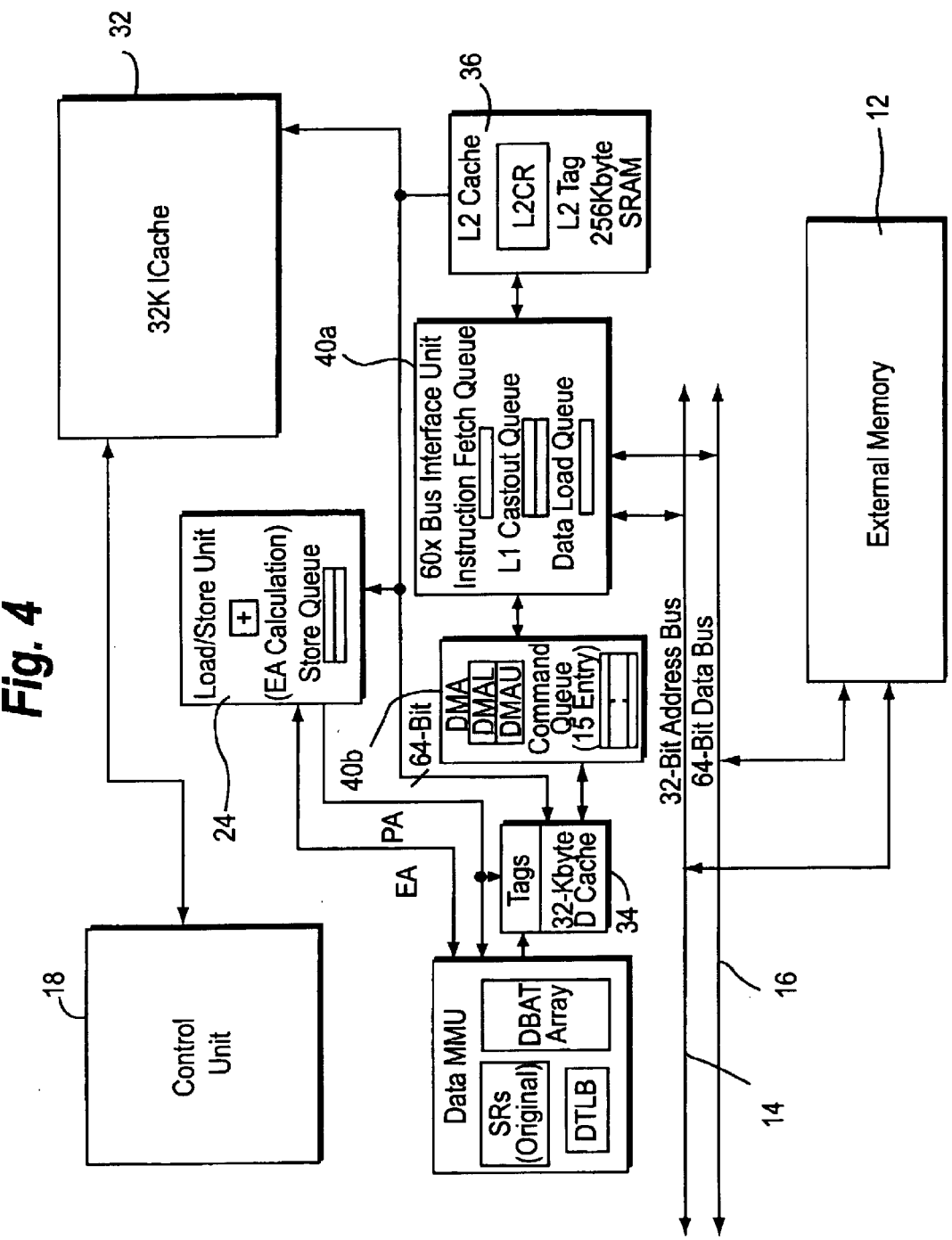
FIG. 4 is a partial and more detailed view of the microprocessor of FIG. 1, wherein a preferred embodiment of a direct memory access (DMA) engine is shown for use in bringing data into and out of the locked cache, in accordance with one embodiment of the instant invention.

In accordance with a preferred embodiment of the instant invention, the microprocessor implements a DMA engine 40b, as shown in FIG. 4, to transfer data between the locked L1 data cache 34b and the external memory 12. The DMA engine 40b has a 15-entry FIFO queue for DMA commands and processes the commands sequentially. The operation of the DMA engine 40b is controlled by two special purpose registers: DMAU and DMAL. The exemplary definitions of the special purpose registers, DMAU and DMAL, are shown in FIGS. 5 and 6, respectively.

As shown in FIG. 5, the DMA_U register is a 32-bit register containing bits 0 through 31, wherein bits 0 through 26 comprise 27-bit high order address bits representing a starting address in main memory and bits 27–31 comprise 5 high order bits representing transfer length in cache lines. As shown in FIG. 6, the DMA_L register is a 32-bit register including bits 0 through 31, wherein bits 0 through 26 comprise 27 high order bits representing a starting address in the locked cache portion, bit 27 comprises a one-bit load command that encodes whether direct memory access transfer is from the locked cache to external memory or from external memory to locked cache, bits 28 through 29 comprise two low order bits representing the transfer length in cache lines, bit 30 comprises a trigger bit representing whether to activate or deactivate direct memory access, and bit 31 comprises a flush bit encoding normal direct memory access operation or flush of a queued direct memory access command.

The DMA engine is disabled at power-up with HID2 (LCE)=0. Setting HID2(LCE)=1 partitions the L1 data cache 32 and enables the engine 40b. When a mtspr instruction sets DMAL(T)=1 and DMAL(F)=0, the DMA engine latches values in DMAU and DMAL to form a DMA command, enqueues the command in the DMA queue and sets DMAL(T)=0. HID2(DMAQL) indicates the number of DMA commands in the DMA queue, including the command in progress (if any). When the DMA queue is not empty, i.e. HID2(DMALQ)=0, the DMA engine processes the commands sequentially. The starting address of the transfer in the data cache is DMAL(LC_ADDR)||0b0000. The starting address of the transfer in the external memory is DMAU(MEM_ADDR)||0b0000. The number of cache lines to be transferred by the command is DMAU(DMA_LEN_U)||DMAL(DMA_LEN_L), except that a value of zero specifies a length of 128 cache lines. The direction of the transfer is determined by DMAL(LD). DMAL(LD)=0 means a transfer from the locked cache to the external cache, while DMAL(LD)=1 means a transfer from the external memory to the locked cache.

For a DMA store command, i.e. DMAL(LD)=0, the DMA engine performs a data cache look-up for each of the cache lines equentially from the starting address. For a look-up hit in the locked cache, the DMA engine initiates a 60x bus write-with-flush transaction to transfer the 32 byte data from the locked cache 34b to the external memory 12. For a DMA load command, i.e. DMAL(LD)=1, the DMA engine performs a data cache lookup for each of the cache lines sequentially from the starting address. For a look-up hit in the locked cache, the DMA engine initiates a 60x bus burst read transaction to transfer the data from the external memory 12 to the locked cache 34b. For all but the last read transaction associated with the DMA load command, the burst read transaction type is 0b01011. The last burst read transaction has a transaction type 0b01010. The microprocessor 10 initiates the bust transaction type 0b01011 only for the DMA load commands. Preferably, the memory controller can use the information to pre-fetch the next cache line to improve the performance.

The DMA access to the cache, both DMA loads and DMA stores, will result in a psuedo-LRU state transition within the four-way set associated with the cache line, but does not affect the MEI state. If the look-up misses the locked cache, the DMA engine transfers no data and continues to the next cache line. Preferably, the only way to flush the DMA engine is to issue a mtspr instruction to set DMAL(f)=1. In this situation, the DMA engine flushes all the commands in the DMA queue, including the command in progress, and sets both DMAL(f)=DMAL(t)=0. Such an instruction should be followed by a sync instruction to ensure that the pending bus transaction associated with the discarded command, if any, complete before the DMA is engine accepts the next DMA command.

It is noted that the microprocessor 10 is considered to be a decoder and executor for the particular instructions described herein. Thus, part of the instant invention involves providing an instruction decoder and executor for the new instructions defined in the above description of the invention. The invention, however, is not limited to a hardware decoder or executor, such as a microprocessor, but also covers software decoders and executors provided by, for example, a virtual machine, such as a software emulator of the instant microprocessor. In other words, the invention also relates to software emulators that emulate the operation of the instant microprocessor by decoding and executing the particular instructions described herein. The invention further relates to a storage medium, such as a compact disk which stores any or all of the unique instructions described herein, thereby enabling a microprocessor or virtual machine to operate in accordance with the invention described herein.

As can be seen from the description above, the instant invention enables 100% software control of the locked portion of the cache, thereby enabling an application to control the contents of the locked cache in a manner that can boost performance as compared to normal cache operation. In other words, the invention provides an improvement to the software assist cache management strategies that are available on, for example, the PowerPC family of microprocessors as described above, by enabling complete software control of a portion of the cache. By enabling complete software control of the locked cache, the invention provides a scratch pad cache for advantageous use by the applications programmer. In accordance with the invention, the is cache may be partitioned to any suitable size and is not limited to equal partitions as described herein. Moreover, the instant invention may be implemented in one or more caches other than a level one data cache.

Other approaches to managing memory as a scratch pad include locking the entire cache once data has been locked, adding a lock bit to the status line bits, and using a contiguous block of memory. The first approach is appropriate for applications where a static block of data is frequently accessed, such as fixed data tables. However, this approach does not work well if the data to be managed is changing, because there is significant overhead in unlocking, changing data and relocking the cache. The second approach provides similar functionality to the instant invention, as described above, but requires additional hardware support beyond that which is found in a normal cache. The third approach is less flexible than the above described embodiment of the instant invention, in that it constrains the data in the SPM to reside in a single large block. Thus, the embodiment of the invention described herein is preferred because both static and dynamic data can be managed, in large or small blocks, with very little additional hardware beyond that which is found in a normal cache. In fact, the invention can be implemented simply by, for example, adding an additional bit to each cache line intended for locking which enables the cache line to be locked, thereby enabling each of the locked cache lines to be advantageously used as software controlled cache. It is noted that the instant invention is particularly advantageous when implemented in low cost, high performance microprocessors, such as microprocessors designed and intended for use in videogame consoles for household use or the like.

While the preferred forms and embodiments have been illustrated and described herein, various changes and modification may be made to the exemplary embodiment without deviating from the scope of the invention, as one skilled in the art will readily understand from the description herein. Thus, the above description is not meant to limit the scope of the appended claims beyond the true scope and sprit of the instant invention as defined herein.

What is claimed is:

1. A microprocessor, comprising a control unit and a cache connected with the control unit for storing data to be used by the control unit, wherein the cache is selectively configurable as either a single cache or as a partitioned cache having a locked cache portion and a normal cache portion, the normal cache portion being controlled by a hardware implemented automatic replacement process, and further wherein the locked cache portion is locked so that the automatic replacement process cannot modify the contents of the locked cache portion, an instruction that enables software to selectively allocate lines in the locked cache portion to correspond to locations in an external memory, and a direct memory access engine that controls transfer of data between the locked cache portion and the external memory, wherein the direct memory access engine includes first and second special purpose registers, wherein the first special purpose register controls transfer of data from the external memory into the locked cache potion and the second special purpose register controls transfer of data from the locked cache portion to the external memory.

2. A microprocessor, comprising a control unit and a cache connected with the control unit for storing data to be used by the control unit, wherein the cache is selectively configurable as either a single cache or as a partitioned cache having a locked cache portion and a normal cache portion, the normal cache portion being controlled by a hardware implemented automatic replacement process, and further wherein the locked cache portion is locked so that the automatic replacement process cannot modify the contents of the locked cache portion, and an instruction that enables software to selectively allocate lines in the locked cache portion to correspond to locations in an external memory, wherein the microprocessor further includes a hardware implementation dependent special purpose register which determines whether the cache is configured as the single normal cache or the partitioned cache.

* * * * *